(12) United States Patent
    Kaminushi (10) Patent No.: US 9,288,356 B2
(45) Date of Patent: Mar. 15, 2016

(54) INFORMATION PROCESSING SYSTEM AND POWER SUPPLY CONTROLLING METHOD

(71) Applicant: Kyohsuke Kaminushi, Kanagawa (JP)

(72) Inventor: Kyohsuke Kaminushi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/572,841

(22) Filed: Dec. 17, 2014

(65) Prior Publication Data

US 2015/0201101 A1    Jul. 16, 2015

(30) Foreign Application Priority Data

Jan. 15, 2014  (JP) ................................ 2014-005222

(51) Int. Cl.
    *H04N 1/00*      (2006.01)
    *H04N 1/327*     (2006.01)

(52) U.S. Cl.
    CPC ....... *H04N 1/00907* (2013.01); *H04N 1/00244* (2013.01); *H04N 1/00323* (2013.01); *H04N 1/00888* (2013.01); *H04N 1/00899* (2013.01); *H04N 1/32771* (2013.01); *H04N 2201/0094* (2013.01)

(58) Field of Classification Search
    None
    See application file for complete search history.

(56) References Cited

U.S. PATENT DOCUMENTS

| 7,364,070 | B2* | 4/2008 | Chang ................. G06Q 20/343 235/381 |
| 8,732,785 | B2* | 5/2014 | Kabuto ............ H04N 21/43635 348/723 |
| 2003/0157959 | A1* | 8/2003 | Makela et al. ................ 455/556 |
| 2003/0191975 | A1* | 10/2003 | Kohara ......................... 713/300 |
| 2007/0208921 | A1* | 9/2007 | Hosouchi et al. ............. 711/170 |
| 2009/0177332 | A1* | 7/2009 | Yokochi ........................ 700/296 |
| 2011/0176171 | A1* | 7/2011 | Hagiuda ...................... 358/1.15 |
| 2011/0196547 | A1* | 8/2011 | Park et al. ..................... 700/296 |
| 2012/0271474 | A1* | 10/2012 | Yoneda et al. ................ 700/295 |
| 2013/0020868 | A1* | 1/2013 | Wu et al. ......................... 307/18 |
| 2013/0063778 | A1* | 3/2013 | Nagasawa .................... 358/1.15 |
| 2014/0280774 | A1 | 9/2014 | Kaminushi |

FOREIGN PATENT DOCUMENTS

JP          2006-025266         1/2006

* cited by examiner

*Primary Examiner* — Ming Hon
(74) *Attorney, Agent, or Firm* — Harness, Dickey & Pierce, P.L.C.

(57) ABSTRACT

An information processing system includes a relaying device on a first network; and an information processing device on a second network different from the first network, the information processing device sending a request to a power supply connection device that provides an electric device with electric power. The relaying device includes a request receiving unit that receives a request from a terminal device to the information processing device; and a request providing unit that provides the request received from the terminal device to the information processing device as a reply to an inquiry from the information processing device. The information processing device includes a request obtaining unit that receives the request from the terminal device via the relaying device; and a request unit that sends, to the power supply connection device, the request received from the terminal device.

9 Claims, 12 Drawing Sheets

| SMART POWER TAP ID | OUTLET ID | DEVICE ID | DEVICE NAME | POWER SUPPLY |
|---|---|---|---|---|
| A | 1 | 28d5e5f4-3115-d84e-c01f-d5a19d89e85b | MFP | OFF |
| A | 2 | 20a5e5f4-3115-d84e-c01f-d5a19d89e85b | PROJECTOR | ON |
| B | 1 | 32d5e5f4-3115-d84e-c01f-d5a19d89e85b | FAX | ON |

| SMART POWER TAP ID | OUTLET ID | DEVICE ID | DEVICE NAME | POWER SUPPLY | INSTANTA-NEOUS POWER | STATUS OF USE |
| --- | --- | --- | --- | --- | --- | --- |
| A | 1 | 28d5e5f4-3115-d84e-c01f-d5a19d89e85b | 19F MFP1 | OFF | 0w | / |
| A | 2 | 20a5e5f4-3115-d84e-c01f-d5a19d89e85b | 1903 PROJECTOR | ON | 100w | / |
| B | 1 | 32d5e5f4-3115-d84e-c01f-d5a19d89e85b | 19F MFP2 | ON | 200w | IN USE |
| B | 2 | 34c5e5f4-3115-d84e-c01f-d5a19d89e85b | 19F MFP3 | ON | 250w | ON STANDBY |
| ... | ... | ... | ... | ... | ... | ... |

INFORMATION PROCESSING SYSTEM AND POWER SUPPLY CONTROLLING METHOD

BACKGROUND OF THE INVENTION

1. Field of the Invention

The present invention relates to an information processing system and a power supply controlling method.

2. Description of the Related Art

There have been power supply management systems for collectively managing, via a network, power supplies of a host device such as a copier and client terminals that use the host device. Such a power supply management system is intended to improve energy saving by collectively managing the power supplies of client terminals with the same conditions (see Patent Document 1, for example).

There have been smart power taps, for example, as a technique of measuring and controlling electric power of each outlet. The smart power tap has a built-in sensor that detects an electric current flowing through an outlet, so that the smart power tap can measure and control power consumption in each outlet.

A power supply connection device such as a smart power tap capable of measuring and controlling power consumption in each outlet may be requested to measure and control power consumption in each outlet from a terminal device operated by a user. However, if the terminal device is connected to a network different from another network to which the power supply connection device is connected, the terminal device may not be able to request the power supply connection device to measure and control power consumption in each outlet.

[Patent Document 1] Japanese Laid-Open Patent Application No. 2006-25266

SUMMARY OF THE INVENTION

It is a general object of at least one embodiment of the present invention to provide an information processing system and a power supply controlling method capable of controlling power supply in response to a request from a terminal device on another network.

In an embodiment, an information processing system is provided. The information processing system includes a relaying device on a first network; and an information processing device on a second network different from the first network, the information processing device sending a request to a power supply connection device that provides an electric device with electric power. The relaying device includes a request receiving unit that receives a request from a terminal device to the information processing device; and a request providing unit that provides the request received from the terminal device to the information processing device as a reply to an inquiry from the information processing device. The information processing device includes a request obtaining unit that receives the request from the terminal device via the relaying device; and a request unit that sends, to the power supply connection device, the request received from the terminal device.

According to an embodiment of the present invention, it is possible to control power supply in response to a request from a terminal device on another network.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

In the following, embodiments of the present invention will be described with reference to the accompanying drawings.

First Embodiment

<System Configuration>

Figure 1:
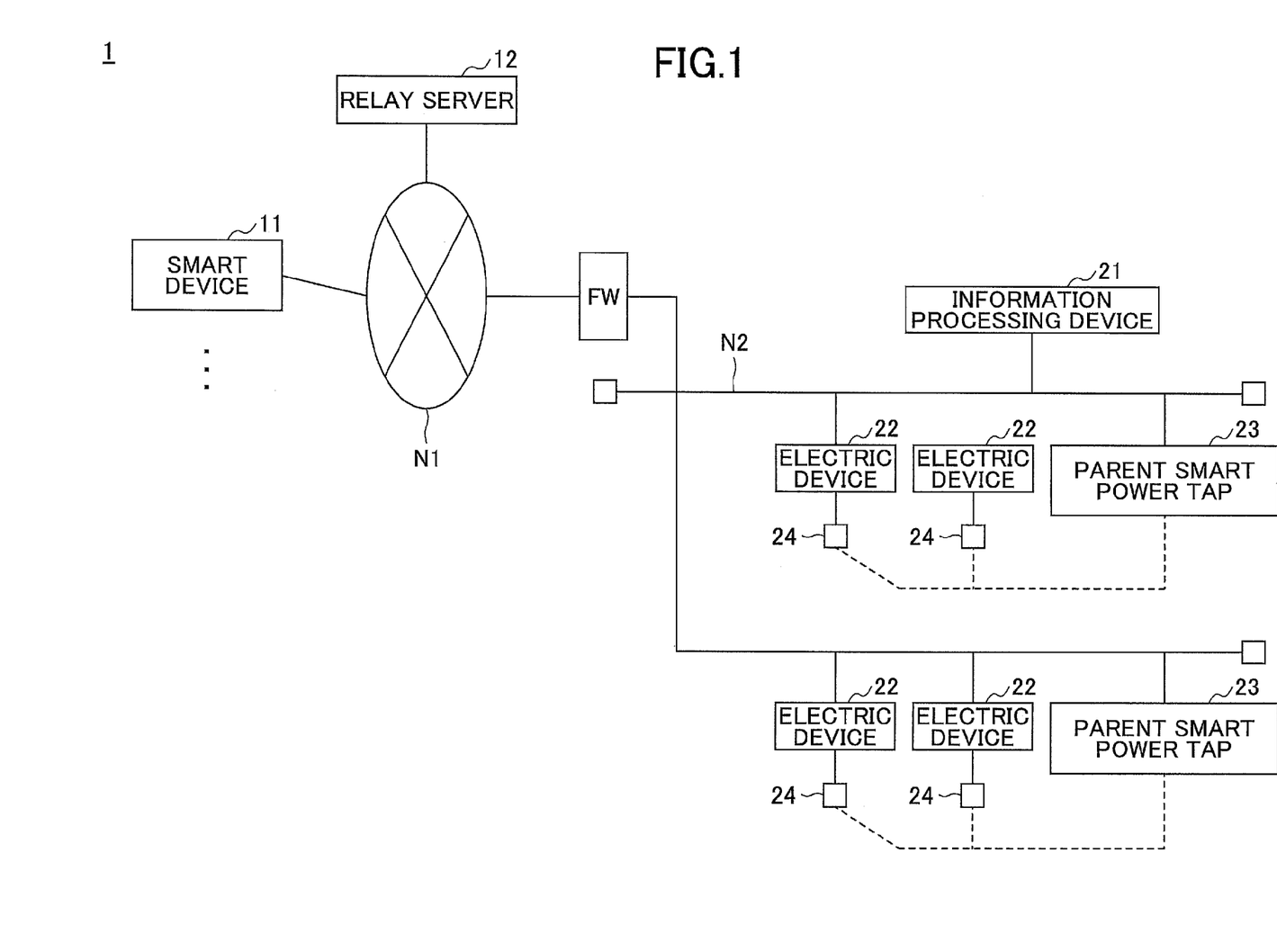
FIG. 1 is a configuration diagram showing an example of an information processing system according to an embodiment of the present invention.

FIG. 1 is a configuration diagram showing an example of an information processing system according to an embodiment of the present invention. In an information processing system 1 shown in FIG. 1, at least one smart device 11 serving as a terminal device, for example, and a relay server 12 are connected to a network N1 such as the Internet. Further, in the information processing system 1 shown in FIG. 1, an information processing device 21, at least one electric device 22, and at least one parent smart power tap 23 are connected to a private network N2 such as a corporate LAN.

The network N1 and the network N2 are connected via a firewall (FW). Further, in the information processing system 1 shown in FIG. 1, a child smart power tap 24 is connected to the electric device 22.

The network N1 includes an intranet using a wired LAN or a wireless LAN and the Internet, for example. The smart device 11 is an example of a terminal device such as a smartphone or a tablet terminal operated by a user. In addition to the smartphone and the tablet terminal, the smart device 11 may include other devices such as a mobile phone and a laptop computer as long as they can be operated by a user.

The relay server 12 enables communication from the smart device 11 beyond the firewall (FW), the smart device 11 being located on the network N1 different from the private network N2. The relay server 12 receives a request from the smart device 11 and sends the request from the smart device 11 as a reply to an inquiry from the information processing device 21.

The electric device 22 is a device whose power consumption is to be measured or whose power supply is to be controlled. Examples of the electric device 22 include devices such as a multifunction peripheral (MFP), a projector, a printer, a scanner, a copier, and an image display device. The electric device 22 may not be connected to the network N2.

The child smart power tap 24 is an example of a power supply connection device in which at least one outlet for providing electric power to the electric device 22 is disposed. The child smart power tap 24 used in the present embodiment is capable of measuring power consumption and controlling power supply (electricity) in each outlet. The parent smart power tap 23 is capable of monitoring power consumption in each outlet measured by the child smart power tap 24 and sending a notification to the information processing device 21. Further, the parent smart power tap 23 is capable of sending a request to control power supply of each outlet to the child smart power tap 24.

If it is possible to specify voltage to be provided to the electric device 22, the child smart power tap 24 may measure a current value instead of power consumption and the parent smart power tap 23 may monitor the current value in each outlet measured by the child smart power tap 24. In this case, the information processing device 21, for example, may convert the current value in each outlet of the child smart power tap 24 into power consumption. Further, the information processing device 21 may be configured to be distributed to a plurality of computers.

In the information processing system 1 shown in FIG. 1, the smart device 11 transmits a request to obtain an operation status or a request to control power supply to the information processing device 21 via the relay server 12. It is possible for the smart device 11 to communicate with the information processing device 21 beyond the firewall (FW) by using the relay server 12. Processes by the relay server 12 will be described later.

The information processing device 21 receives the request to obtain an operation status or the request to control power supply from the smart device 11 and sends a request in accordance with the request to obtain an operation status or the request to control power supply to the parent smart power tap 23. The parent smart power tap 23 sends the request from the information processing device 21 to the child smart power tap 24. The child smart power tap 24 measures power consumption or controls power supply in each outlet in accordance with a received request.

In addition, as shown in FIG. 1, a plurality of parent smart power taps 23 may be disposed to receive a request from the information processing device 21. Further, a plurality of child smart power taps 24 may be disposed to receive a request from the parent smart power tap 23.

<Hardware Configuration>

Figure 2:
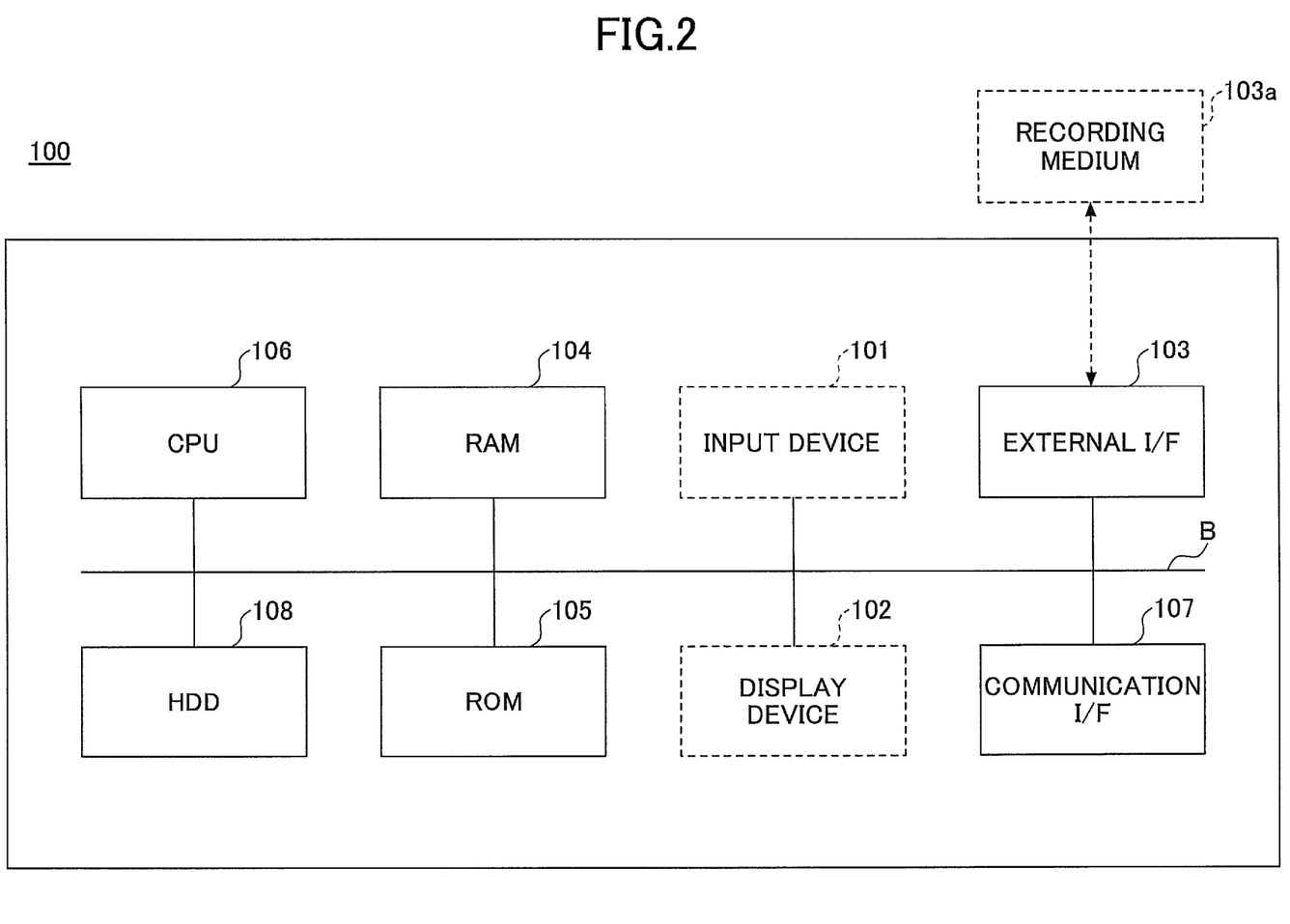
FIG. 2 is a hardware configuration diagram showing an example of a computer according to an embodiment of the present invention.

The smart device 11, the relay server 12, and the information processing device 21 can be implemented by a computer having a hardware configuration as shown in FIG. 2, for example. FIG. 2 is a hardware configuration diagram showing an example of the computer according to the present embodiment.

A computer 100 shown in FIG. 2 includes an input device 101, a display device 102, an external I/F 103, a RAM 104, a ROM 105, a CPU 106, a communication I/F 107, an HDD 108, and the like connected mutually to one another via a bus B. The input device 101 and the display device 102 may be connected and used where necessary.

The input device 101 includes a keyboard, a mouse, a touch panel, and the like and is used to input operation signals to the computer 100. The display device 102 includes a display screen and displays a result of a process performed by the computer 100. The communication I/F 107 is an interface for connecting the computer 100 to the networks N1 and N2. The computer 100 can perform data communication with other computer 100, the electric device 22, the parent smart power tap 23, and the like via the communication I/F 107.

The HDD 108 is a non-volatile storage device that stores a program and data. Examples of such a program and data to be stored include an OS which functions as basic software for controlling an entire portion of the computer 100 and include application software for providing various types of functions on the OS. Further, the HDD 108 manages the stored program and data based on a predetermined file system and/or a database (DB).

The external I/F 103 is an interface for an external device. The external device includes a recording medium 103a, for example. The computer 100 can read and/or write on the recording medium 103a via the external I/F 103. Examples of the recording medium 103a include a flexible disk, a CD, a DVD, an SD memory card, a USB memory, and the like.

The ROM 105 is a non-volatile semiconductor memory (storage device) capable of storing a program and data even in a powered-off state. The ROM 105 stores a BIOS to be executed when the computer 100 starts up, an OS setting, a program for a network setting, and data. The RAM 104 is a volatile semiconductor memory (storage device) for temporarily storing a program and data.

The CPU 106 is an arithmetic unit that controls an entire portion of the computer 100 and implements functions thereof by reading out a program and data from a storage device such as the ROM 105 or the HDD 108 onto the RAM 104 and executing a process.

The computer 100 according to the present embodiment with the above-mentioned hardware configuration can perform various types of processes as described later.

<Software Configuration>

<<Information Processing Device>>

Figure 3:
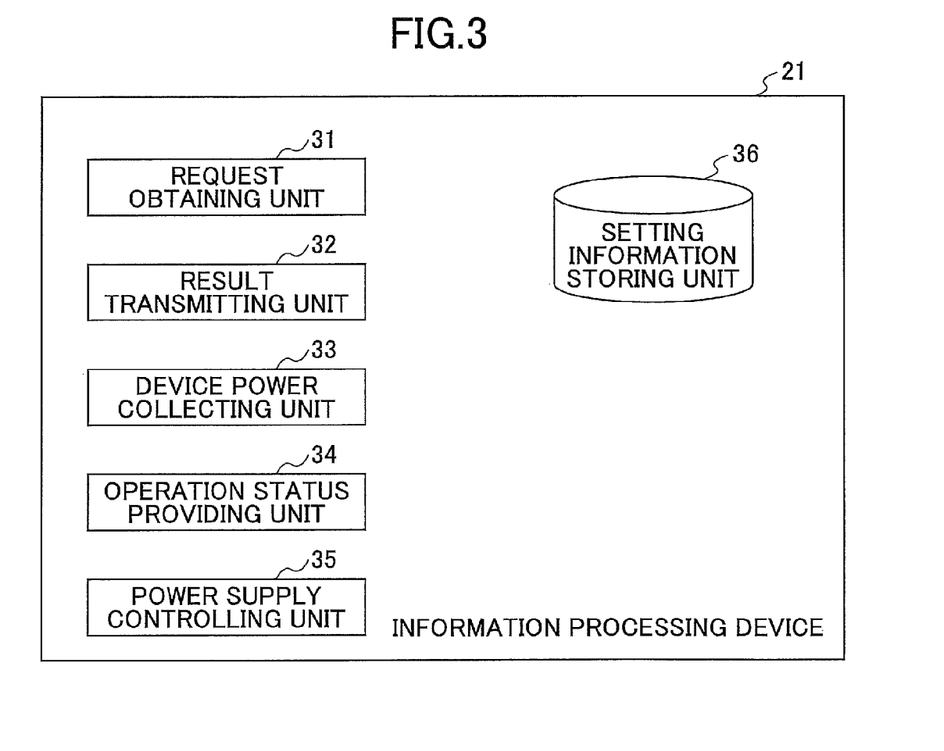
FIG. 3 is a functional block diagram showing an example of an information processing device according to an embodiment of the present invention.

The information processing device 21 according to the present embodiment is implemented by functional blocks as shown in FIG. 3, for example. FIG. 3 is a functional block diagram showing an example of the information processing device 21 according to the present embodiment. When a program is executed, the information processing device 21 implements a request obtaining unit 31, a result transmitting unit 32, a device power collecting unit 33, an operation status providing unit 34, a power supply controlling unit 35, and a setting information storing unit 36.

The request obtaining unit 31 receives a request to obtain an operation status or a request to control power supply from the smart device 11 via the relay server 12. The result transmitting unit 32 transmits a result of processing the request to obtain an operation status or the request to control power supply to the smart device 11 via the relay server 12. The device power collecting unit 33 communicates with the parent smart power tap 23 to collect information about power consumption measured in each outlet of the child smart power tap 24. The collected information about the power consumption is stored in a storage device such as the HDD 108.

The operation status providing unit 34 determines an operation status of the electric device 22 from the information about power consumption measured in each outlet of the child smart power tap 24, for example, in response to the request to obtain an operation status from the smart device 11. The operation status providing unit 34 provides the result transmitting unit 32 with the determined operation status of the electric device 22 as a result of processing the request to obtain an operation status.

The power supply controlling unit 35 communicates with the parent smart power tap 23 to send a request for power supply control in each outlet of the child smart power tap 24 in response to the request to control power supply from the smart device 11. The setting information storing unit 36 stores setting information used for various types of processes by the information processing device 21. The setting information stored in the setting information storing unit 36 includes associated information for associating the electric device 22 with the child smart power tap 24 as described later.

<<Relay Server>>

Figure 4:
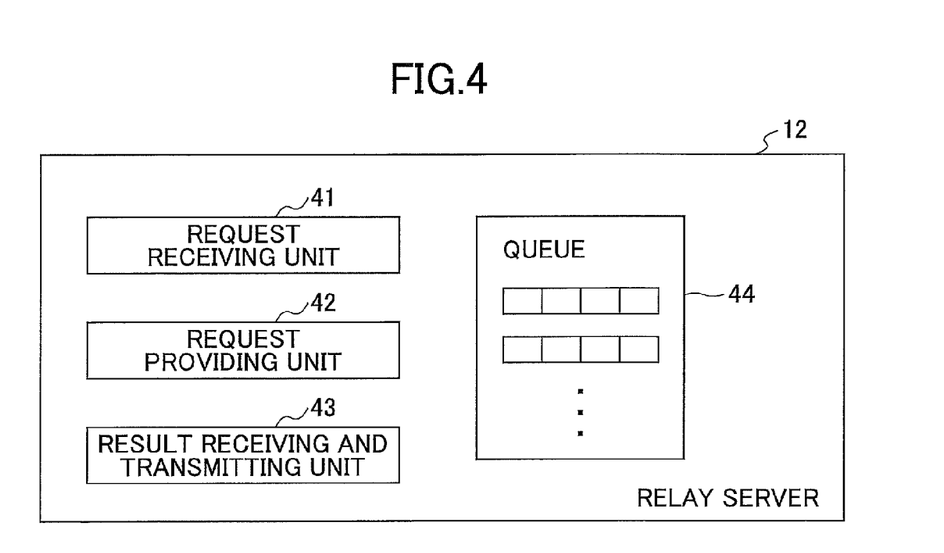
FIG. 4 is a functional block diagram showing an example of a relay server according to an embodiment of the present invention.

The relay server 12 according to the present embodiment is implemented by functional blocks as shown in FIG. 4, for example. FIG. 4 is a functional block diagram showing an example of the relay server 12 according to the present embodiment. When a program is executed, the relay server 12 implements a request receiving unit 41, a request providing unit 42, and a result receiving and transmitting unit 43.

The request receiving unit 41 receives a message containing a request to obtain an operation status or a message containing a request to control power supply addressed to the information processing device 21 from the smart device 11 and puts the message in a queue 44 prepared for the information processing device 21. Through polling, for example, the request providing unit 42 receives, from the information processing device 21, an inquiry of whether there is a message addressed to the information processing device 21. If a message addressed to the information processing device 21 for which the inquiry is received is in the queue 44, the request providing unit 42 sends the message as a reply (response) to the inquiry.

The result receiving and transmitting unit 43 receives a result of processing the request to obtain an operation status or the request to control power supply from the information processing device 21 and sends the result of processing as a reply to the smart device 11 that sent the request to obtain an operation status or the request to control power supply. In each information processing device 21, the queue 44 stores a received message containing the request to obtain an operation status or the request to control power supply.

<<Data Configuration>>

Figure 5:
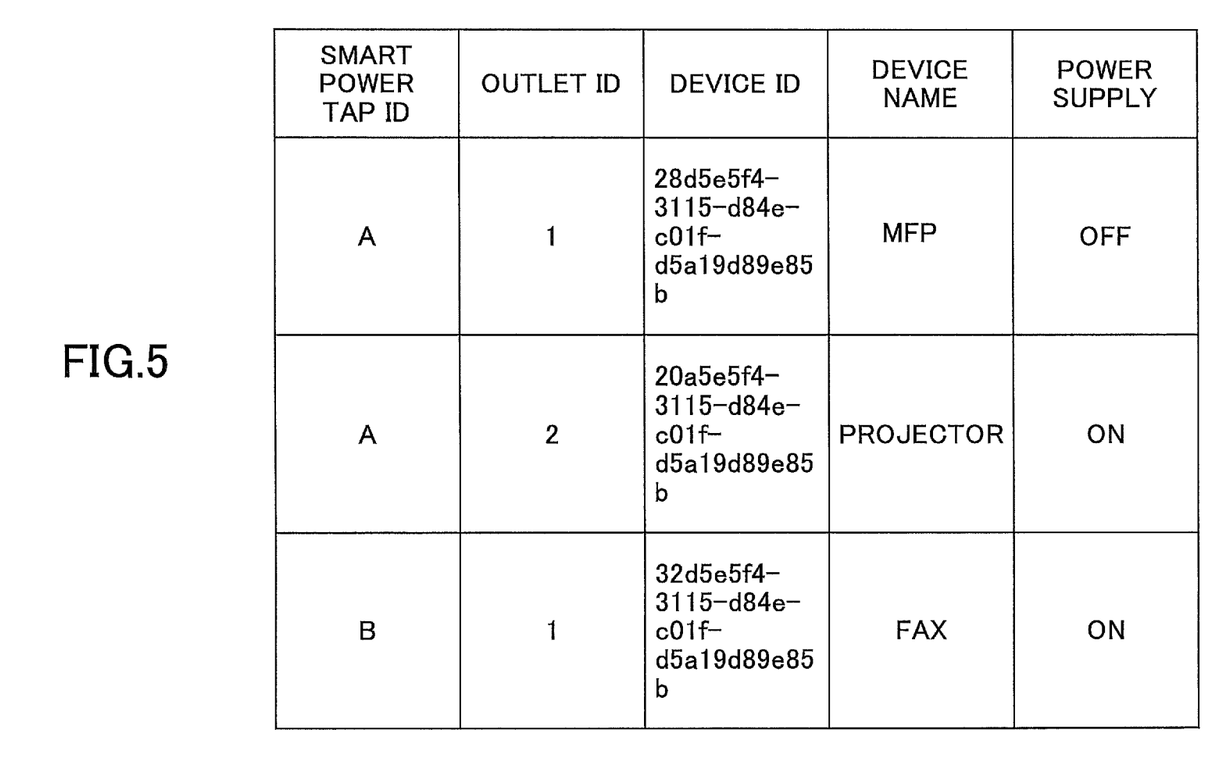
FIG. 5 is a configuration diagram showing an example of associated information.

The setting information storing unit 36 of the information processing device 21 stores associated information as shown in FIG. 5, for example. FIG. 5 is a configuration diagram showing an example of the associated information. The associated information shown in FIG. 5 is for associating the electric device 22 with an outlet of the child smart power tap 24.

The associated information shown in FIG. 5 includes a smart power tap ID, an outlet ID, a device ID, a device name, and a power supply as data items. The smart power tap ID represents information for identifying the child smart power tap 24. The outlet ID represents information for identifying an outlet disposed in the child smart power tap 24. The device ID represents information for identifying the electric device 22 connected to the outlet. The device name represents a name of the electric device 22 associated with the device ID. The power supply represents information for indicating a power supply (electricity) status of the electric device 22 connected to the outlet using ON/OFF.

<Details of Processes>

In the following, details of processes in the information processing system 1 according to the present embodiment are described.

Figure 6:
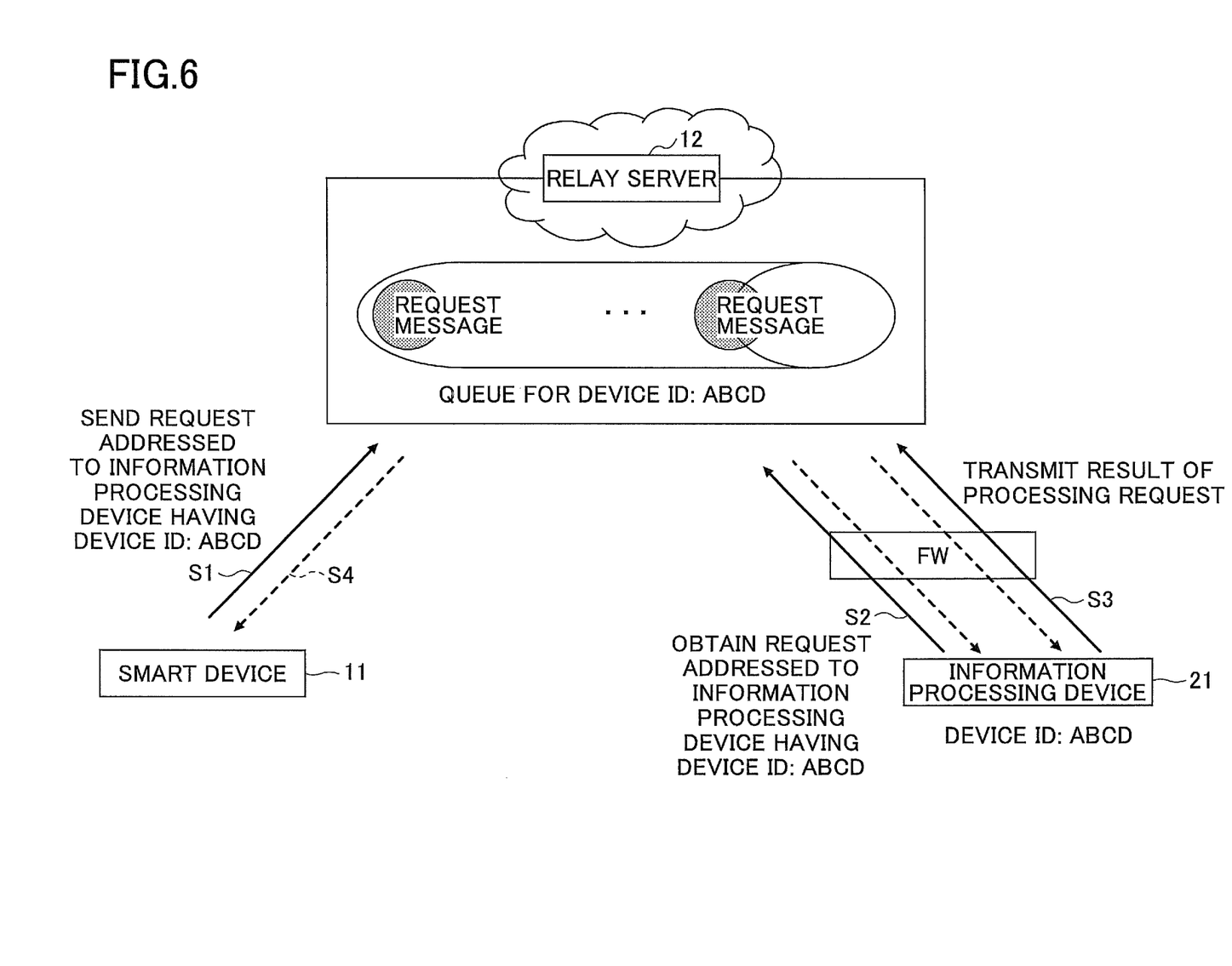
FIG. 6 is an illustration of an example of communication between a smart device and an information processing device.

FIG. 6 is an illustration of an example of communication between the smart device 11 and the information processing device 21. In step S1, for example, the smart device 11 transmits, to the relay server 12, a message containing a request to obtain an operation status or a message containing a request to control power supply addressed to the information processing device 21 with a device ID "ABCD".

The request receiving unit 41 of the relay server 12 puts the message received from the smart device 11 in the queue 44 prepared for the information processing device 21 with the device ID "ABCD". The information processing device 21 with the device ID "ABCD" sends an inquiry of whether there is a message addressed to the information processing device 21 with the device ID "ABCD" to the relay server 12 by polling.

In step S2, the request providing unit 42 of the relay server 12 receives the inquiry of whether there is a message addressed to the information processing device 21 with the device ID "ABCD" from the information processing device 21 with the device ID "ABCD". The request providing unit 42 extracts a message from the queue 44 prepared for the information processing device 21 with the device ID "ABCD" and sends the extracted message to the information processing device 21 with the device ID "ABCD" as a reply to the inquiry.

The request obtaining unit 31 of the information processing device 21 receives the extracted message addressed to the information processing device 21. The request obtaining unit 31 performs a process of the request to obtain an operation status or the request to control power supply by using the device power collecting unit 33, the operation status providing unit 34, the power supply controlling unit 35, and the like. In step S3, the result transmitting unit 32 of the information processing device 21 transmits a result of processing the request to obtain an operation status or the request to control power supply to the relay server 12.

The result receiving and transmitting unit 43 of the relay server 12 receives the result of processing the request to obtain an operation status or the request to control power supply. In step S4, the result receiving and transmitting unit 43 sends, as a reply, the result of processing to the smart device 11 that sent the request to obtain an operation status or the request to control power supply.

In accordance with the communication shown in FIG. 6, the smart device 11 of the information processing system 1 can transmit the request to obtain an operation status or the request to control power supply to the information processing device 21 beyond the firewall (FW).

Figure 7:
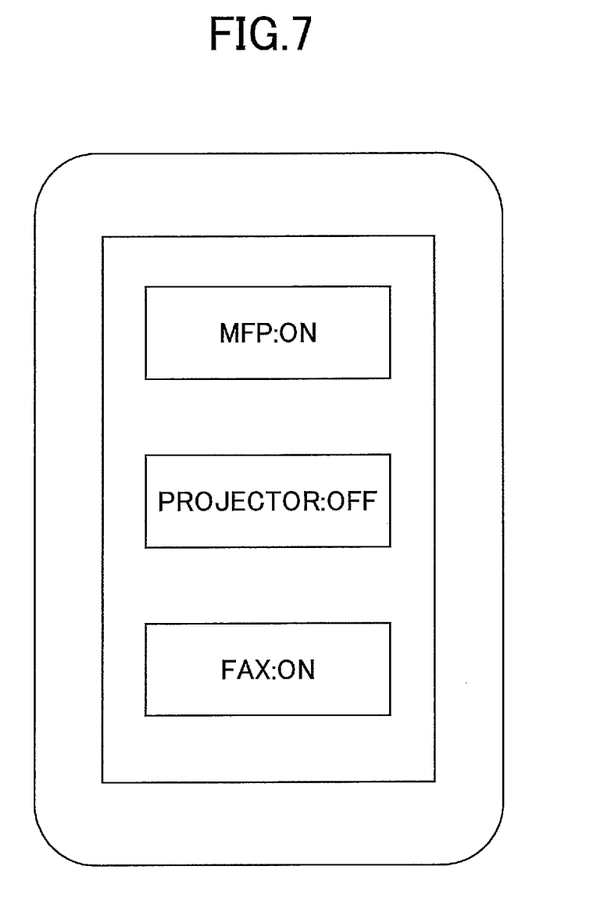
FIG. 7 is an illustration of an example of a screen in a smart device.

The smart device 11 receives the result of processing the request to obtain an operation status and displays a screen as shown in FIG. 7, for example. FIG. 7 is an illustration of an example of a screen of the smart device 11. The screen in FIG. 7 displays device names of the electric devices 22 and information for indicating power supply statuses of the electric devices 22 using ON/OFF.

A user operating the smart device 11 can confirm operation statuses of the electric devices 22 connected to the child smart power taps 24 by checking the screen shown in FIG. 7. Further, the screen in FIG. 7 may accept a request to control power supply of the electric device 22 from the user. For example, on the screen in FIG. 7, device names of the electric devices 22 and information for indicating power supply statuses of the electric devices 22 using ON/OFF may be disposed on buttons. When one of the buttons is pressed, the request to control power supply of the electric device 22 may be accepted in order to switch ON/OFF the power supply status. The smart device 11 accepts the request to control power supply of the electric device 22 from the screen in FIG. 7 and transmits, to the relay server 12, a message containing the request to control power supply addressed to the information processing device 21.

<<Conclusion>>

According to the information processing system 1 of the present embodiment, it is possible to send a request to obtain an operation status or a request to control power supply from the smart device 11 on the network N1 to the information processing device 21 on the private network N2 such as a corporate LAN different from the network N1. Thus, according to the information processing system 1 of the present embodiment, the smart device 11 on the network N1, which is different from the network N2 on which the information processing device 21 is located, can obtain the operation status or control the power supply of the electric device 22.

From the smart device 11 on the network N1, which is different from the network N2 on which the information processing device 21 is located, the user can confirm the operation status of the electric device 22 and select the electric device 22 to control the power supply thereof.

Second Embodiment

Figure 8:
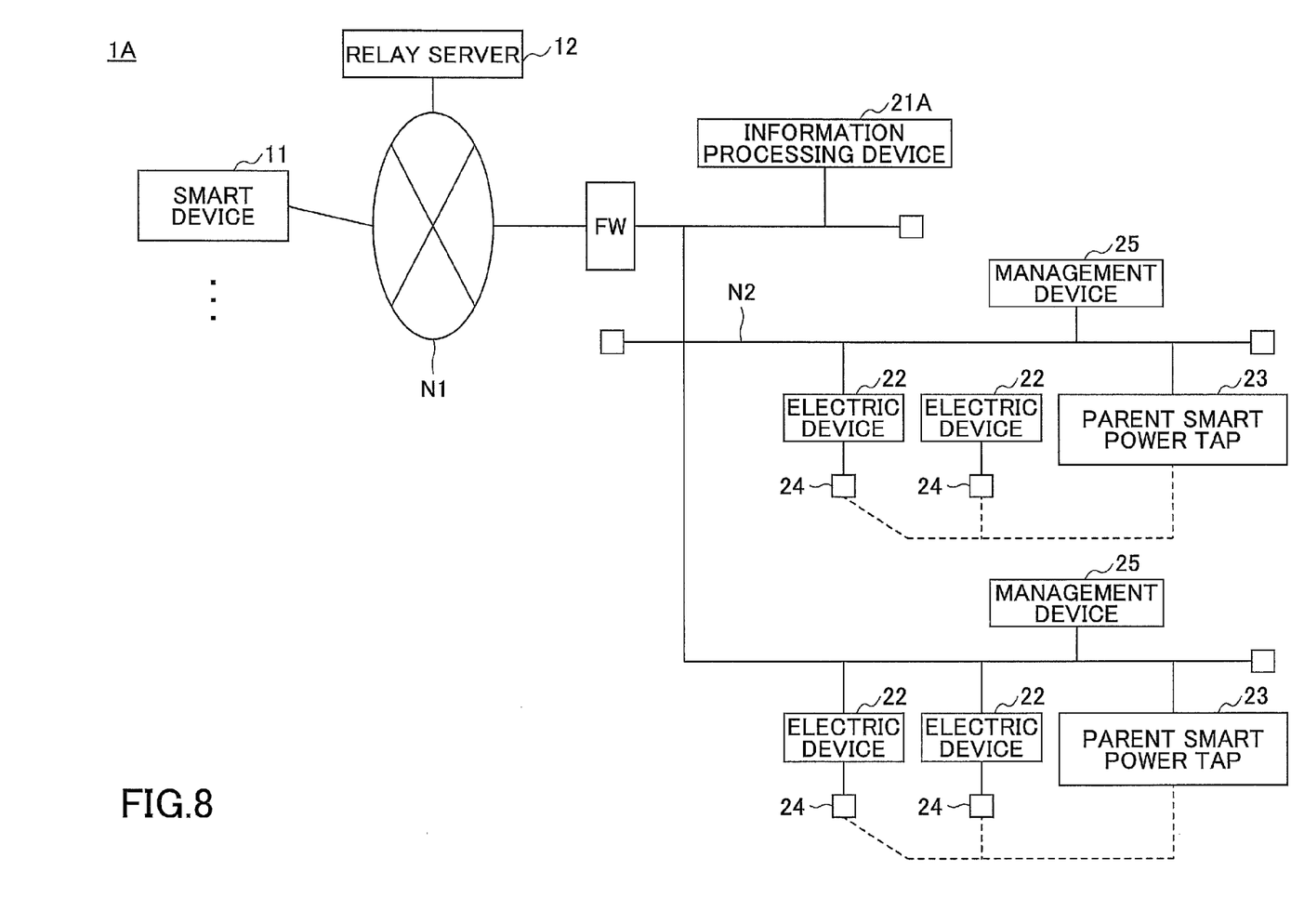
FIG. 8 is a configuration diagram showing an example of an information processing system according to a second embodiment of the present invention.

The information processing system 1 shown in FIG. 1 can be configured as shown in FIG. 8, for example. FIG. 8 is a configuration diagram showing an example of an information processing system according to a second embodiment of the present invention. An information processing system 1A shown in FIG. 8 is configured by dividing functions of the information processing device 21 of the information processing system 1 shown in FIG. 1 into an information processing device 21A and a management device 25.

For example, the information processing device 21A mainly performs a process related to communication with the relay server 12. The management device 25 mainly performs a process related to communication with the parent smart power tap 23. In the information processing system 1A shown in FIG. 8, the smart device 11 transmits a request to obtain an operation status or a request to control power supply to the information processing device 21A via the relay server 12.

The information processing device 21A receives the request to obtain an operation status or the request to control power supply from the smart device 11 and sends the request to obtain an operation status or the request to control power supply to at least one management device 25 registered in advance. The management device 25 transmits, to the parent smart power tap 23, a request in accordance with the request to obtain an operation status or the request to control power supply from the information processing device 21A. The parent smart power tap 23 transmits the request from the management device 25 to the child smart power tap 24. The child smart power tap 24 measures power consumption or controls power supply in each outlet in accordance with a received request. A plurality of management devices 25 that receive a request from the information processing device 21A may be disposed as shown in FIG. 8.

According to the information processing system 1A of the second embodiment, it is possible to divide the functions of the information processing device 21 of the information processing system 1 shown in FIG. 1 into the information processing device 21A and the management device 25 in stages.

Third Embodiment

Figure 9:
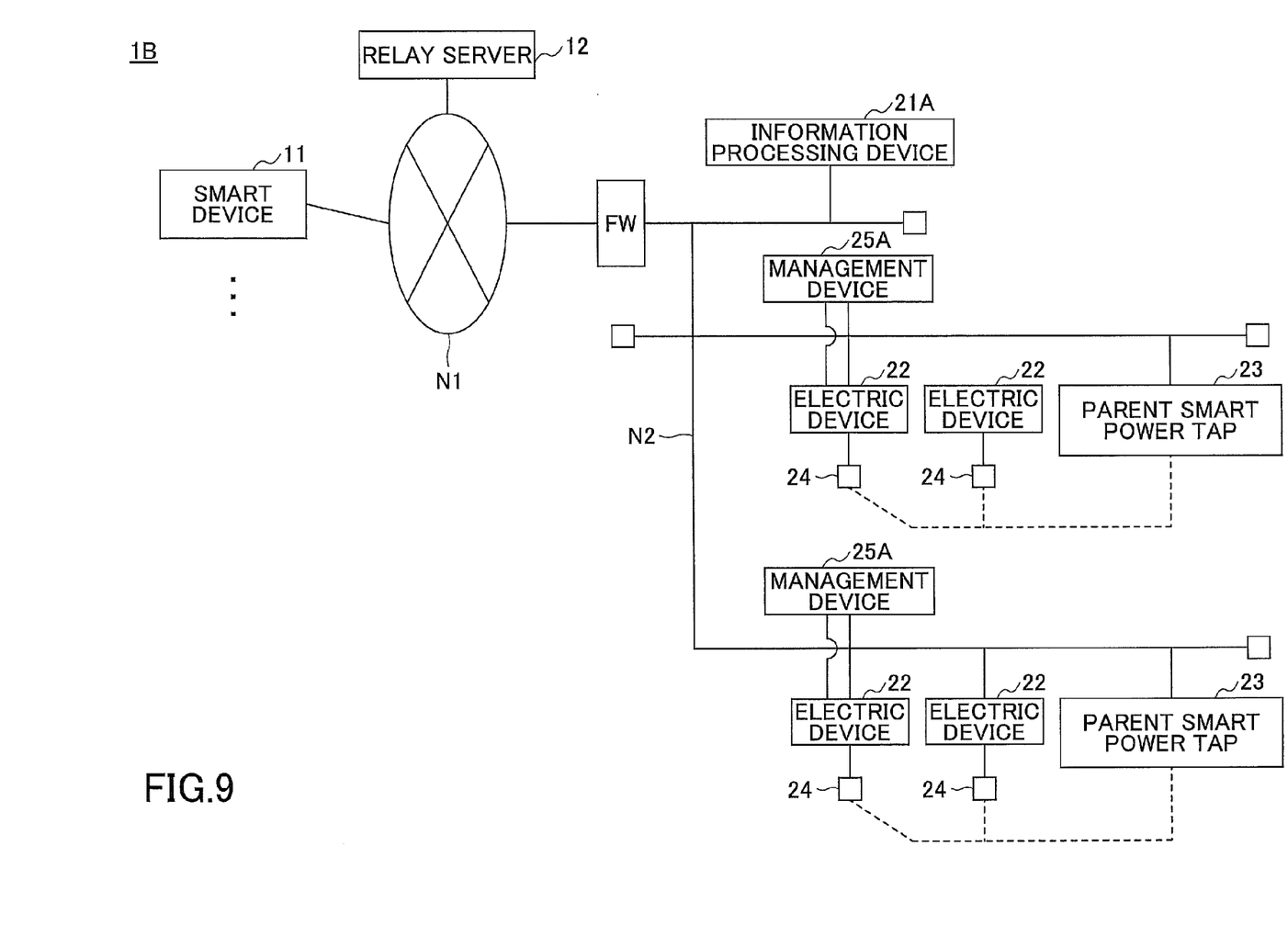
FIG. 9 is a configuration diagram showing an example of an information processing system according to a third embodiment of the present invention.

The information processing system 1A shown in FIG. 8 may be configured as shown in FIG. 9, for example. FIG. 9 is a configuration diagram showing an example of an information processing system according to a third embodiment of the present invention. An information processing system 1B shown in FIG. 9 is configured by disposing a function of the management device 25 in the information processing system 1A shown in FIG. 8 as a management device 25A for providing a function of an operation panel for the electric device 22, for example.

Figure 10:
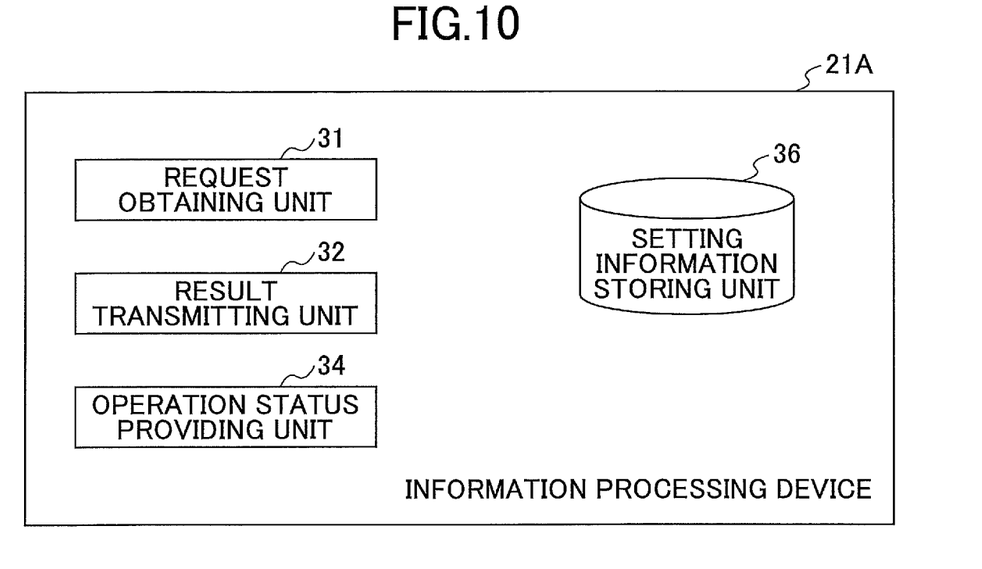
FIG. 10 is a functional block diagram showing an example of an information processing device according to a third embodiment of the present invention.

The information processing device 21A according to the third embodiment is implemented by functional blocks as shown in FIG. 10, for example. FIG. 10 is a functional block diagram showing an example of the information processing device 21A according to the third embodiment of the present invention. When a program is executed, the information processing device 21A implements the request obtaining unit 31, the result transmitting unit 32, the operation status providing unit 34, and the setting information storing unit 36. In other words, the information processing device 21A shown in FIG. 10 is configured by removing the device power collecting unit 33 and the power supply controlling unit 35 from the information processing device 21 shown in FIG. 3.

The setting information storing unit 36 stores setting information used for various types of processes by the information processing device 21A. The setting information stored in the setting information storing unit 36 includes associated information for associating the electric device 22 with the child smart power tap 24 as described later.

Figure 11:
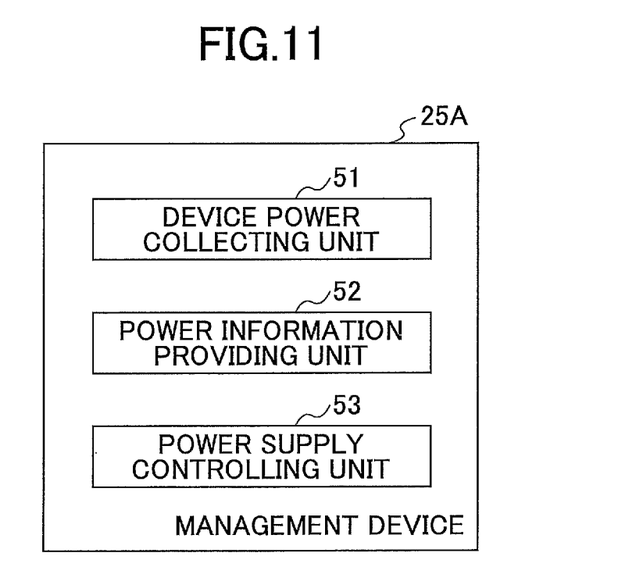
FIG. 11 is a functional block diagram showing an example of a management device according to a third embodiment of the present invention.

The management device 25A according to the third embodiment is implemented by functional blocks as shown in FIG. 11, for example. FIG. 11 is a functional block diagram showing an example of the management device 25A according to the third embodiment of the present invention. When a program is executed, the management device 25A implements a device power collecting unit 51, a power information providing unit 52, and a power supply controlling unit 53.

The device power collecting unit 51 communicates with the parent smart power tap 23 and collects information about power consumption measured in each outlet of the child smart power tap 24. Collected information about power consumption is stored in a storage device such as the HDD 108. The power information providing unit 52 provides the information processing device 21A with power information. The power information providing unit 52 also provides the information processing device 21A with device information about the electric device 22.

The power supply controlling unit 53 communicates with the parent smart power tap 23 and sends a request to control power supply in each outlet of the child smart power tap 24 to the parent smart power tap 23 in accordance with a request to control power supply from the smart device 11.

Figure 12:
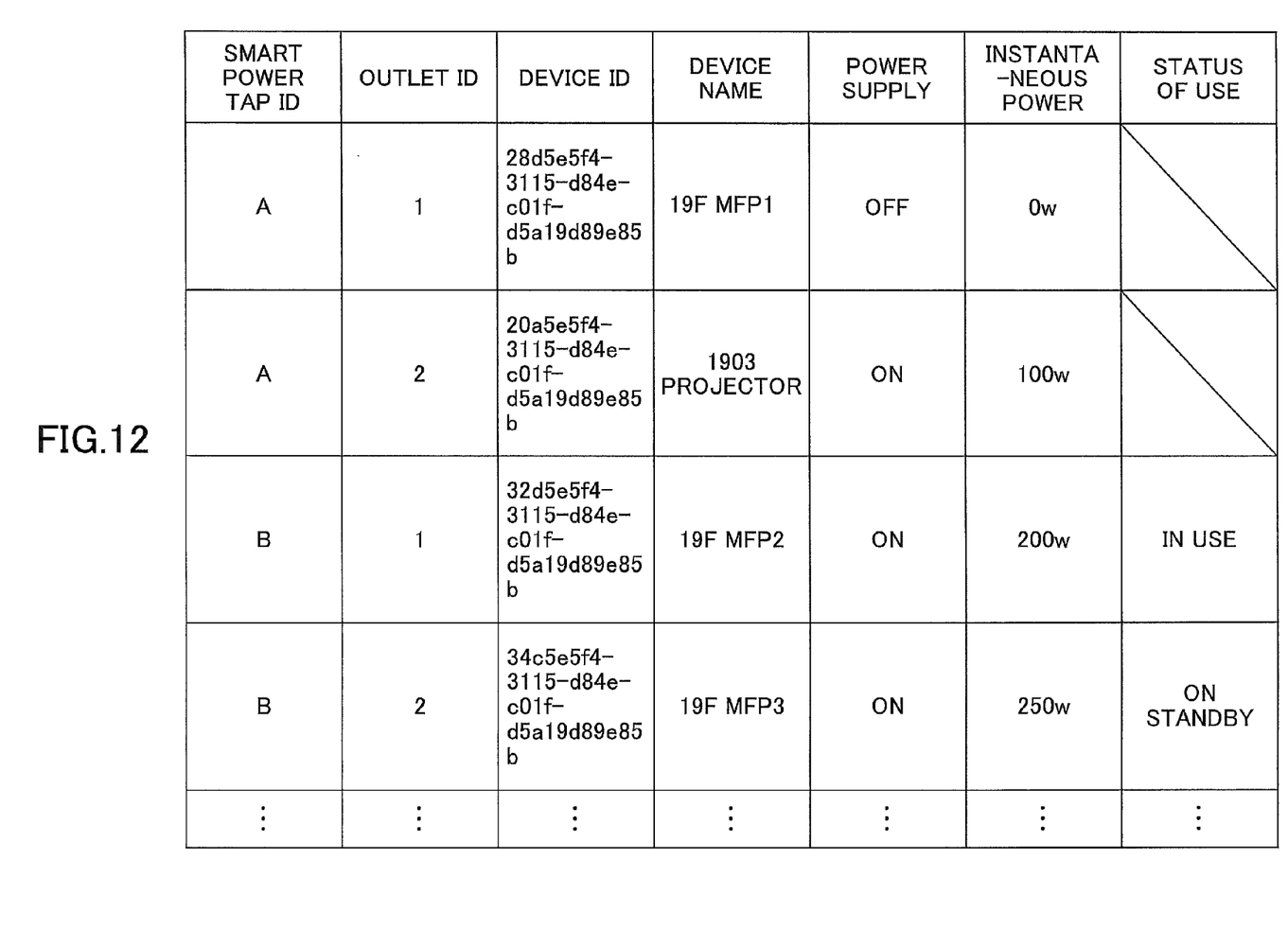
FIG. 12 is a configuration diagram showing another example of associated information.

The setting information storing unit 36 of the information processing device 21A stores associated information as shown in FIG. 12, for example. FIG. 12 is a configuration diagram showing another example of associated information. The associated information shown in FIG. 12 is for associating the electric device 22 with an outlet of the child smart power tap 24.

The associated information shown in FIG. 12 includes a smart power tap ID, an outlet ID, a device ID, a device name, a power supply, instantaneous power, and a status of use as data items. The associated information shown in FIG. 12 is configured by adding the instantaneous power and the status of use to the items of the associated information shown in FIG. 5.

The instantaneous power represents instantaneous power of each electric device 22. The status of use represents a status of use of each electric device 22 such as "in use" and "on standby". In FIG. 12, some of the statuses of use are given a slash to indicate a case where the electric device 22 is not energized or a case where the status of use cannot be obtained in the information processing device 21A.

Figure 13:
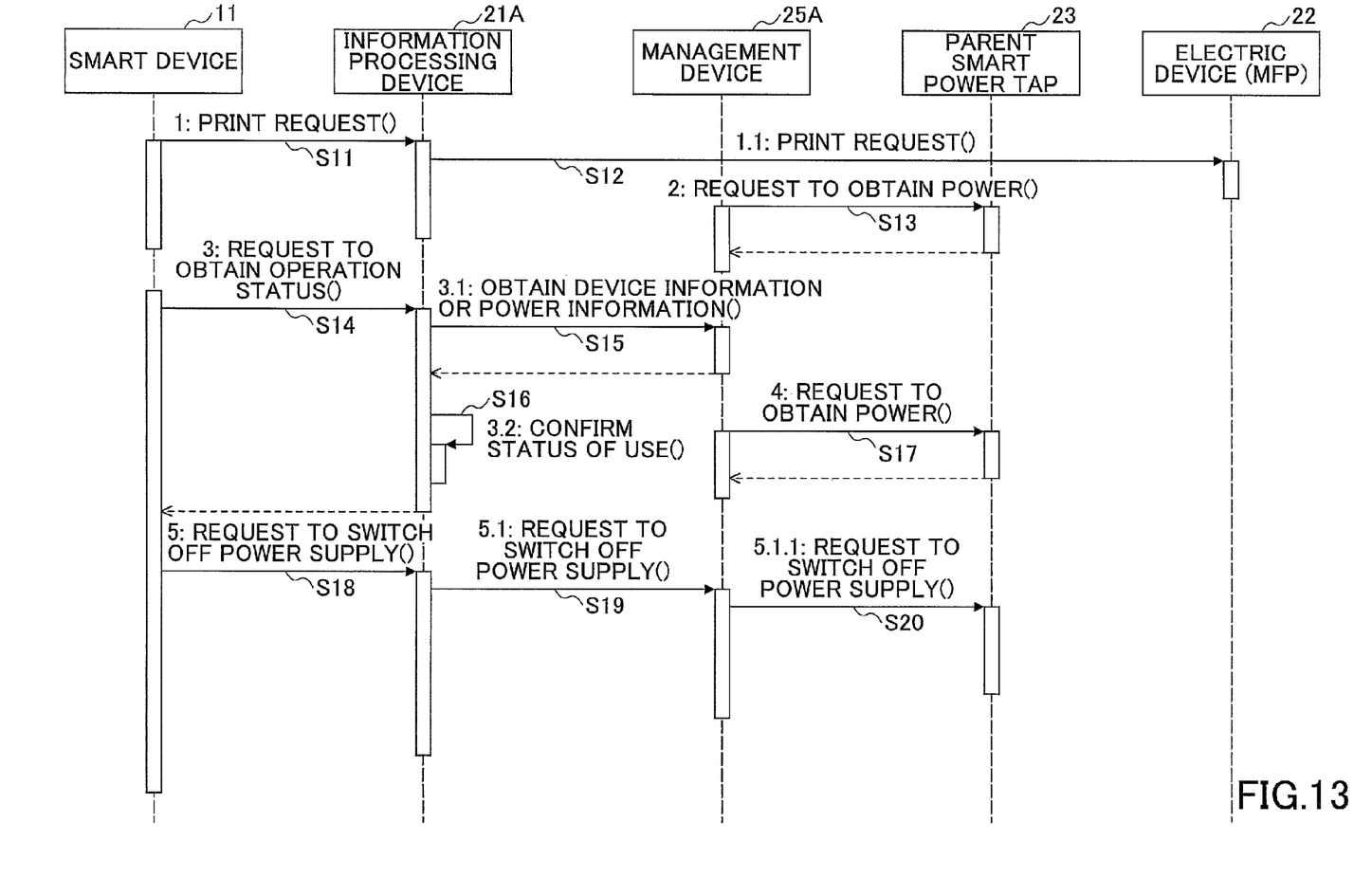
FIG. 13 is a sequence diagram representing a procedure of an information processing system according to a third embodiment of the present invention.

FIG. 13 is a sequence diagram representing a procedure of an information processing system according to the third embodiment of the present invention. In FIG. 13, a process of the relay server 12 is omitted. In step S11, the smart device 11 sends a print request to the information processing device 21A.

In step S12, the information processing device 21A sends the print request to an MFP which is an example of the electric device 22. The MFP starts a print process in accordance with the print request. In step S13, the management device 25A obtains power information from the parent smart power tap 23 by polling.

In step S14, the smart device 11 transmits a request to obtain an operation status to the information processing device 21A. In step S15, the information processing device 21A obtains device information or power information about the electric device 22 from the management device 25A. In step S16, the information processing device 21A confirms a status of use of the electric device 22 related to the device information obtained in step S15. It is possible to confirm the status of use of the electric device 22 by storing a request sent to the electric device 22 such as the print request sent in step S12.

Figure 14:
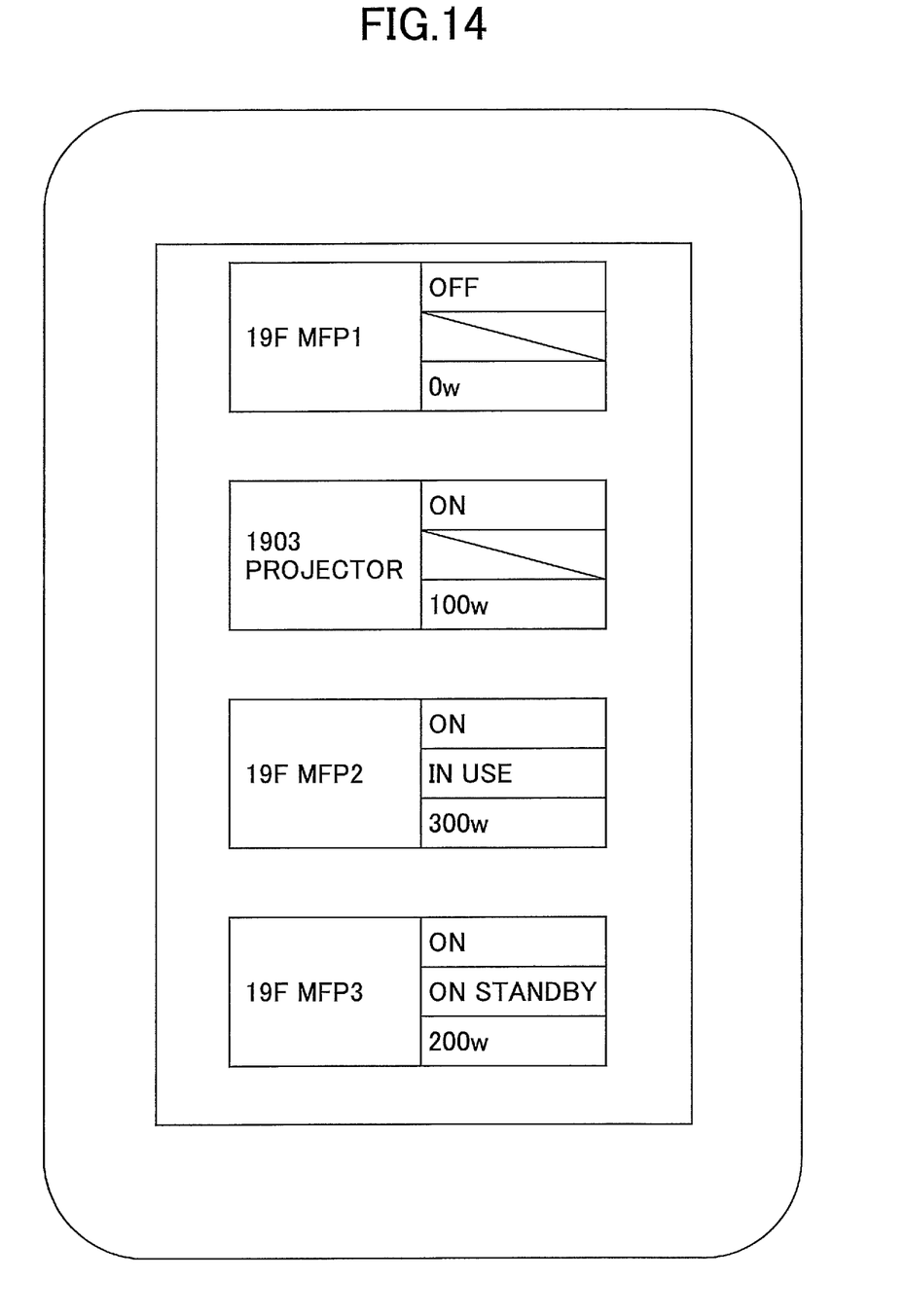
FIG. 14 is an illustration of an example of a screen in a smart device.

The information processing device 21A sends a result of processing, as a reply, to the smart device 11 that sent the request to obtain an operation status in step S14. The smart device 11 displays a screen as shown in FIG. 14, for example, in accordance with the result of processing as the reply. FIG. 14 is an illustration of an example of the screen of the smart device 11. The example of the screen in FIG. 14 displays device names of the electric devices 22, power supply statuses, statuses of use, and instantaneous power of the electric devices 22.

The power supply status represents whether the electric device 22 is energized (ON) or not (OFF). The status of use represents whether the electric device 22 is "in use" or "on standby". By checking the screen in FIG. 14, a user operating the smart device 11 can confirm operation statuses of the electric devices 22 connected to the child smart power taps 24 such as the power supply status, the status of use, and the instantaneous power.

Further, the screen in FIG. 14 may accept a request to control power supply of the electric device 22 from the user. For example, on the screen in FIG. 14, device names of the electric devices 22 and information that indicates power supply statuses, statuses of use, and instantaneous power of the electric devices 22 may be disposed on buttons and when one of the buttons is pressed, the request to control power supply of the electric device 22 may be accepted in order to switch ON/OFF the power supply status. The smart device 11 accepts the request to control power supply of the electric device 22 from the screen in FIG. 14 and transmits the request to control power supply addressed to the information processing device 21A in step S18. In steps S19 and S20, the information processing device 21A transmits the request to control power supply from the smart device 11 to the parent smart power tap 23 via the management device 25A.

According to the information processing system 1B of the third embodiment, it is possible to dispose a function of the information processing device 21 of the information processing system 1 shown in FIG. 1 by the information processing device 21A and the management device 25A for providing a function of the operation panel for the electric device 22, for example. Further, in the information processing system 1B of the third embodiment, in addition to information about the power supply status and the instantaneous power of the electric device 22, it is possible to display information about the status of use of the electric device 22 on the smart device 11 as a result of a request sent to the electric device 22 by the smart device 11.

The relay server 12 is an example of a relaying device described in the claims. In the same manner, the request obtaining unit 31 is an example of a request obtaining unit. The device power collecting unit 33 and the power supply controlling unit 35 are an example of a requesting unit. The information processing device 21A is an example of a communication device that communicates with the relaying device. And the outlet is an example of a power supply connection unit.

Further, the present invention is not limited to these embodiments, and various variations and modifications may be made without departing from the scope of the present invention.

The present application is based on and claims the benefit of priority of Japanese Priority Patent Application No. 2014-005222 filed on Jan. 15, 2014, the entire contents of which are hereby incorporated by reference.

What is claimed is:

1. An information processing system comprising:
a relaying device on a first network; and
an information processing device on a second network different from the first network, the information processing device sending a request to a power supply connection device that provides an electric device, on the second network, with electric power,
wherein the relaying device comprises:
a request receiving unit that receives a request from a terminal device to the information processing device, the terminal device being remote from, and in wireless connection with, the relaying device and the information processing device via the first network; and
a request providing unit that provides the request received from the terminal device to the information processing device as a reply to an inquiry from the information processing device, and
wherein the information processing device comprises:
a request obtaining unit that receives the request from the terminal device via the relaying device; and
a request unit that sends, to the power supply connection device, the request received from the terminal device.

2. The information processing system as claimed in claim 1, wherein the relaying device further comprises a result receiving and sending unit that receives a result of processing the request sent from the information processing device to the power supply connection device and sends, to the terminal device, the received result of processing the request.

3. The information processing system as claimed in claim 1, wherein the request unit sends a request for information about power consumption of the electric device to the power supply connection device based on the request from the terminal device.

4. The information processing system as claimed in claim 1, wherein the request unit sends a request to control power supply of the electric device to the power supply connection device based on the request from the terminal device.

5. The information processing system as claimed in claim 1, wherein the information processing device is divided into a communication device that communicates with the relaying device and a management device that communicates with the power supply connection device.

6. The information processing system as claimed in claim 5, wherein the communication device that communicates with the relaying device confirms a status of use of the electric device based on the request sent to the power supply connection device, adds the status of use of the electric device to a result of processing the request sent from the management device to the power supply connection device, and sends, to the relaying device, the status of use together with the result of processing the request.

7. The information processing system as claimed in claim 1, wherein the power supply connection device comprises at least one power supply connection unit and measures power consumption or controls power supply in each power supply connection unit.

8. The information processing system as claimed in claim 1, further comprising a parent smart power tap, wherein the power supply connection device is a child smart power tap whose power consumption is monitored by the parent smart power tap.

9. A method for controlling power supply performed in an information processing system the system including a relaying device on a first network; and an information processing device on a second network different from the first network, the information processing device sending a request to a power supply connection device that provides an electric device with electric power, the method comprising:
    by the relaying device, receiving a request from a terminal device on the first network and located remote to the relaying device and the information processing device;
    by the relaying device, providing the request received from the terminal device to the information processing device as a reply to an inquiry from the information processing device; and
    by the information processing device, sending, to the power supply connection device, the request received from the terminal device via the relaying device.

\* \* \* \* \*